United States Patent
Ryu et al.

(10) Patent No.: US 10,067,393 B2
(45) Date of Patent: Sep. 4, 2018

(54) THIN FILM DISPLAY PANEL AND LIQUID CRYSTAL DISPLAY DEVICE INCLUDING THE SAME

(71) Applicant: Samsung Display Co., Ltd., Yongin, Gyeonggi-Do (KR)

(72) Inventors: Soo Hye Ryu, Yongin-si (KR); Yun Ho Lee, Cheonan-si (KR); Yui Ku Lee, Asan-si (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 456 days.

(21) Appl. No.: 14/676,459

(22) Filed: Apr. 1, 2015

(65) Prior Publication Data
US 2016/0178945 A1     Jun. 23, 2016

(30) Foreign Application Priority Data
Dec. 17, 2014  (KR) ..................... 10-2014-0182300

(51) Int. Cl.
*G02F 1/1335*  (2006.01)
*G02F 1/1362*  (2006.01)

(52) U.S. Cl.
CPC .. *G02F 1/136286* (2013.01); *G02F 1/133514* (2013.01); *G02F 2001/133519* (2013.01); *G02F 2001/136222* (2013.01)

(58) Field of Classification Search
CPC ... G02F 2001/136222; G02F 1/136286; G02F 2001/13629; G02F 2001/136295
See application file for complete search history.

(56) References Cited

U.S. PATENT DOCUMENTS

| | | | |
|---|---|---|---|
| 7,542,112 B2* | 6/2009 | Rhee | G02F 1/1362 349/106 |
| 2006/0208293 A1* | 9/2006 | Lim | G02F 1/133514 257/294 |

FOREIGN PATENT DOCUMENTS

| | | |
|---|---|---|
| KR | 10-2005-0064358 A | 6/2005 |
| KR | 10-2010-0077979 A | 7/2010 |
| KR | 10-1033461 B1 | 4/2011 |
| KR | 10-2012-0066323 A | 6/2012 |
| KR | 10-2012-0134222 A | 12/2012 |

* cited by examiner

*Primary Examiner* — Paisley L Arendt
(74) *Attorney, Agent, or Firm* — Innovation Counsel LLP

(57) ABSTRACT

An exemplary embodiment of the present system and method provides a thin film display panel including: an insulation substrate configured to include a red area, a blue area, a green area, and a white area; a gate line and a data line disposed on the insulation substrate; a step compensating member disposed in the white area on the insulation substrate; a red color filter, a green color filter, and a blue color filter respectively disposed at the red area, the blue area, and the green area on the insulation substrate; a planarization layer configured to cover the red color filter, the green color filter, the blue color filter, and the step compensating member; and a plurality of pixel electrodes formed on the planarization layer.

9 Claims, 3 Drawing Sheets

THIN FILM DISPLAY PANEL AND LIQUID CRYSTAL DISPLAY DEVICE INCLUDING THE SAME

CROSS-REFERENCE TO RELATED APPLICATION

This application claims priority to and the benefit of Korean Patent Application No. 10-2014-0182300 filed in the Korean Intellectual Property Office on Dec. 17, 2014, the entire contents of which are incorporated herein by reference.

BACKGROUND (a) Technical Field

The present disclosure relates to a thin film display panel and a liquid crystal display including the same, and more particularly, to a thin film display panel having improved side visibility and a liquid crystal display including the same.

(b) Description of the Related Art

A liquid crystal display (LCD) is a flat panel display and generally includes a pair of panels provided with field-generating electrodes and a liquid crystal (LC) layer interposed between the two panels. The LCD displays images by applying signals to the field-generating electrodes to generate an electric field in the LC layer that determines the orientation of LC molecules therein to adjust polarization of incident light.

The liquid crystal display includes a thin film transistor array panel and a common electrode panel facing each other. The thin film transistor array panel includes a gate line for transmitting a gate signal, a data line intersecting the gate line and for transmitting a data signal, a thin film transistor connected to the gate line and the data line, and a pixel electrode connected to the thin film transistor. The common electrode panel includes a light blocking member, a color filter, and a common electrode.

However, such a liquid crystal display may have problems in visibility and viewing angle. While various modes of liquid crystal displays have been developed in order to solve the problems, these problems still persist.

The above information disclosed in this Background section is only for enhancement of understanding of the background of the present system and method, and therefore, it may contain information that does not form the prior art that is already known in this country to a person of ordinary skill in the art.

SUMMARY

A method for disposing a white pixel as well as red, green, and blue pixels to improve luminance of a liquid crystal display is proposed. In the case of a white pixel, it is not required to form a color filter. Furthermore, for simplicity of the manufacturing process, it is advantageous to omit the step of forming a transparent layer in place of the color filter. However, since no color filter or transparent layer is formed at the white pixel, the height of a stacked thin film layer is reduced as compared with other pixels, thereby obtaining a different cell gap and a U-shaped profile of the stacked thin film layer, which influences the behavior of the liquid crystal. As a result, various problems such as light leakage (causing contrast ratio deterioration), liquid crystal texture defects, and side visibility deterioration are generated. The present system and method provide a thin film display panel capable of reducing light leakage, liquid crystal texture defects, and side visibility deterioration, and a liquid crystal display having the same.

An exemplary embodiment of the present system and method provides a thin film display panel including: an insulation substrate configured to include a red area, a blue area, a green area, and a white area; a gate line and a data line disposed on the insulation substrate; a step compensating member disposed in the white area on the insulation substrate; a red color filter, a green color filter, and a blue color filter respectively disposed at the red area, the blue area, and the green area on the insulation substrate; a planarization layer configured to cover the red color filter, the green color filter, the blue color filter, and the step compensating member; and a plurality of pixel electrodes formed on the planarization layer.

The step compensating member may include a same material as that of the gate line and the data line.

The step compensating member may include a portion of a gate insulating layer covering the gate line and a portion of a passivation layer covering the data line.

A height difference between the pixel electrodes of the white pixel area and the other pixel areas may be equal to or smaller than 0.2 µm.

The thin film display panel may further include a thin film transistor connected to the gate line and the data line, and including a semiconductor unit and an ohmic contact layer, and the step compensating member may include a same material as that of the semiconductor unit and the ohmic contact layer.

The step compensating member includes a same material as that of the gate line and the data line.

A height difference between the pixel electrodes of the white pixel area and the other pixel areas may be equal to or smaller than 0.2 µm.

An exemplary embodiment of the present system and method provides a manufacturing method of a thin film display panel, including: forming a gate line and a first step compensating member on an insulation substrate; forming a gate insulating layer on the gate line; forming a semiconductor unit on the gate insulating layer; forming a data line and a second step compensating member on the semiconductor unit; forming a passivation layer on the data line; forming a color filter on the passivation layer; forming a planarization layer on the color filter; and forming a pixel electrode on the planarization layer, wherein the first step compensating member and the second step compensating member overlap with each other without overlapping with the color filter.

The gate insulating layer may be formed to cover the first step compensating member, and the passivation layer may be formed to cover the second step compensating member.

Forming the semiconductor unit may include forming a third step compensating member that overlaps the first step compensating member.

An exemplary embodiment of the present system and method provides a liquid crystal display including: a thin film display panel configured to include an insulation substrate including a red area, a blue area, a green area, and a white area, a gate line and a data line disposed on the insulation substrate, a step compensating member disposed in the white area on the insulation substrate, a red color filter, a green color filter, and a blue color filter respectively disposed at the red area, the blue area, and the green area on the insulation substrate, a planarization layer covering the red color filter, the green color filter, the blue color filter, and the step compensating member, and a plurality of pixel electrodes formed on the planarization layer; a second insulation substrate configured to face the first insulation substrate; an opposing display panel configured to include a common electrode formed on the second insulation substrate; and a liquid crystal layer configured to be filled in a space between the thin film display panel and the opposing display panel.

The step compensating member may include a same material as that of the gate line and the data line.

The step compensating member may include a portion of a gate insulating layer covering the gate line and a portion of a passivation layer covering the data line.

The thin film display panel may further include a thin film transistor connected to the gate line and the data line, and including a semiconductor unit and an ohmic contact layer, and the step compensating member may include a same material as that of the semiconductor unit and the ohmic contact layer.

According to the exemplary embodiments of the present system and method, in the thin film display panel and the liquid crystal display including the same, no or substantially no step is formed at the white pixel, and the profile of the white pixel is not formed to have a U shape, thereby reducing light leakage, liquid crystal texture defects, and side visibility deterioration

DETAILED DESCRIPTION OF THE EMBODIMENTS

Figure 1:
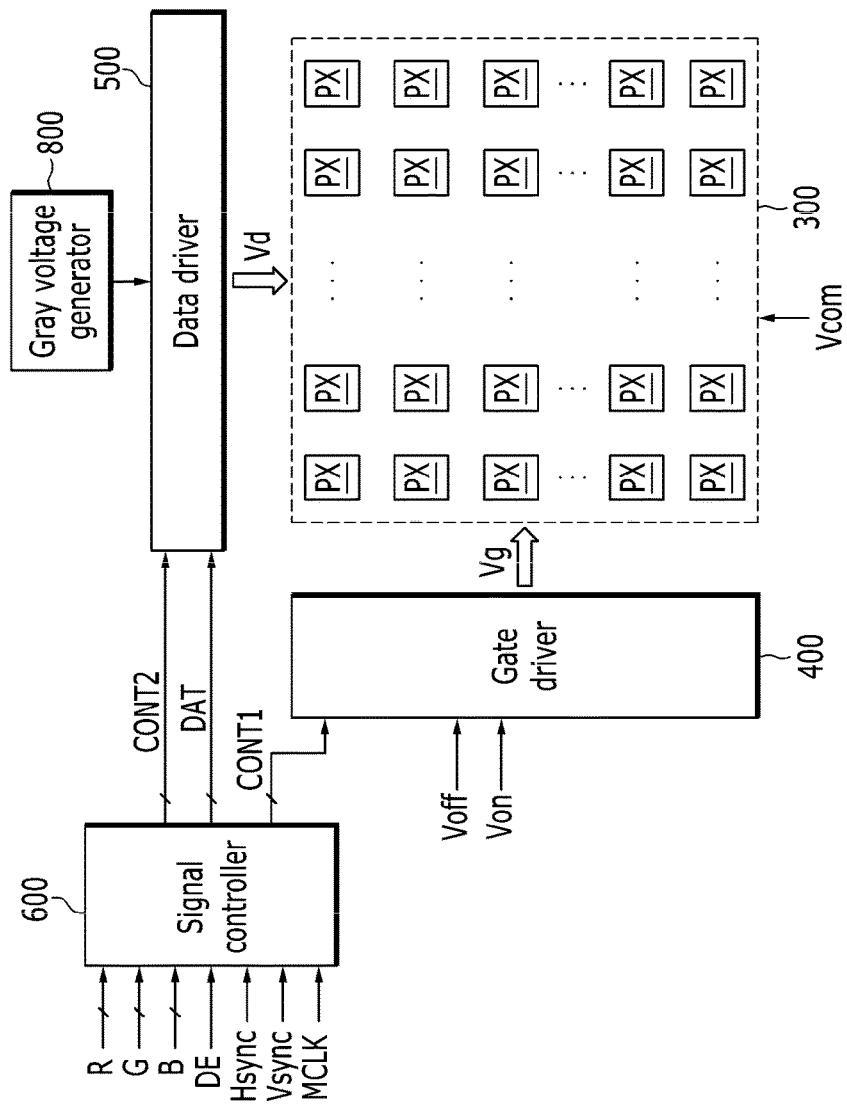
FIG. 1 is a block diagram illustrating a liquid crystal display according to an exemplary embodiment of the present system and method.

The present system and method are described more fully hereinafter with reference to the accompanying drawings in which exemplary embodiments of the present system and method are shown. Those of ordinary skill in the art would realize that the described embodiments may be modified in various different ways without departing from the spirit or scope of the present system and method.

In the drawings, the thickness of layers, films, panels, regions, etc., are exaggerated for clarity. Like reference numerals designate like elements throughout the specification. When an element such as a layer, film, region, or substrate is referred to as being "on" another element, it may be directly on the other element, or intervening elements may also be present. In contrast, when an element is referred to as being "directly on" another element, there are no intervening elements present.

A liquid crystal display according to an exemplary embodiment of the present system and method is described below with reference to the accompanying figures.

Figure 2:
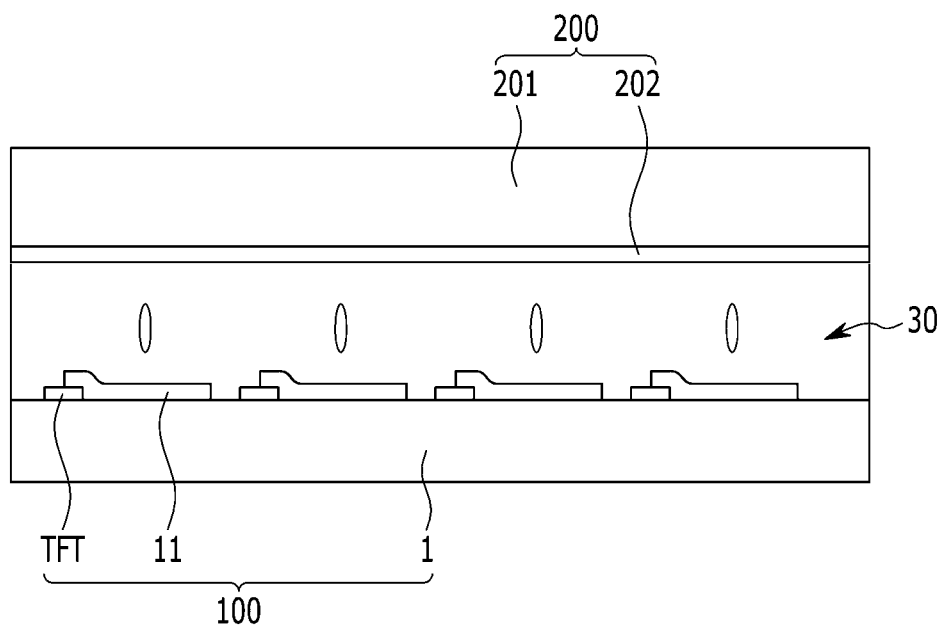
FIG. 2 is a cross-sectional view illustrating a liquid crystal panel assembly of a liquid crystal display according to an exemplary embodiment of the present system and method.

FIG. 1 is a block diagram illustrating a liquid crystal display according to an exemplary embodiment of the present system and method FIG. 2 is a cross-sectional view illustrating a liquid crystal panel assembly of a liquid crystal display according to an exemplary embodiment of the present system and method.

As shown in FIG. 1, the liquid crystal display includes a liquid crystal panel assembly 300, a gate driver 400 and a data driver 500 connected to the liquid crystal panel assembly 300, a gray voltage generator 800 connected to the data driver 500, and a signal controller 600 for controlling the above-listed components.

The gray voltage generator 800 generates reference gray voltages (hereinafter referred to as "gray voltages" for short) related to the transmittance of the pixels PX. The gray voltages may be positive or negative with respect to a common voltage Vcom.

The gate driver 400 is connected to a gate line of the liquid crystal panel assembly 300, and applies a gate signal Vg configured by a combination of a gate-on voltage Von and a gate-off voltage Voff to the gate line.

The data driver 500 is connected to the data line of the liquid crystal panel assembly 300, and selects a gray voltage from the gray voltage generator 800 and applies the gray voltage as the data voltage Vd to the data line. However, if the gray voltage generator 800 does not provide the voltage for all gray levels, but provides a predetermined number of reference gray voltages, the data driver 500 may divide the reference gray voltage to generate gray voltages for all the gray levels and then select a data signal from among them.

The signal controller 600, which controls the gate driver 400 and the data driver 500, may include an image signal converter (not shown.

The drivers 400, 500, 600, and 800 may be directly installed on the liquid crystal panel assembly 300 as a form of one or more IC chips, installed on a flexible printed circuit film (not shown) attached on the liquid crystal panel assembly 300 as a form of a tape carrier package (TCP), or installed on a separate printed circuit board (PCB) (not shown). Alternatively, the above-mentioned drivers 400, 500, 600, and 800 may be integrated in the liquid crystal panel assembly 300 together with the signal lines and the thin film transistor switching elements. Further, all or some of the drivers 400, 500, 600, and 800 may be integrated as a single chip. If only some of the drivers are integrated as the single chip, at least one driver or at least one circuit element that constitutes the driver may be disposed outside the single chip.

The liquid crystal panel assembly 300 includes a plurality of signal lines (not shown) and a plurality of pixels PX that are connected to the signal lines. As FIG. 1 shows, the plurality of pixels PX are arranged substantially in a matrix form. As seen from the structure shown in FIG. 2, the liquid crystal panel assembly 300 includes a thin film transistor array panel 100 and an opposing display panel 200, which face each other with a liquid crystal layer 30 interposed therebetween.

The signal lines include a plurality of gate lines (not shown) that transmit a gate signal (also referred to a "scan signal") and a plurality of data lines (not shown) that transmit a data signal. The gate lines are disposed to extend substantially in a row direction and to be substantially parallel to each other. Further, the data lines are disposed to extend substantially in a column direction and to be substantially parallel to each other.

The opposing display panel 200 includes a transparent insulation substrate 201 and a common electrode 202 formed on the substrate 201. The common electrode 202 is formed on an entire surface of the opposing display panel 200 and receives a common voltage Vcom.

The liquid crystal layer 30 has a negative dielectric anisotropy. That is, the liquid crystal molecules of the liquid crystal layer 30 may be oriented perpendicular to the thin film transistor array panel 100 in the absence of an electric field.

The thin film display panel 100 includes a transparent insulation substrate 1, thin film transistors (TFTs), and pixel electrodes 11 formed on the insulation substrate 1. The thin film transistors are switching elements that each connect to a corresponding gate line and a corresponding data line. When a gate-on voltage Von is transferred through a gate line, the thin film transistor connected to the gate line applies a gray voltage (image signal voltage) transferred through the data line to a corresponding pixel electrode 11. The thin film display panel 100 may include a color filter for displaying colors and a light blocking member for preventing colors between pixels from being mixed.

One or more polarizers (not shown) for providing light polarization are attached on outer surfaces of the liquid crystal panel assembly 300.

A thin film display panel for a liquid crystal display according to an exemplary embodiment of the present system and method is described below with reference to FIG. 3.

Figure 3:
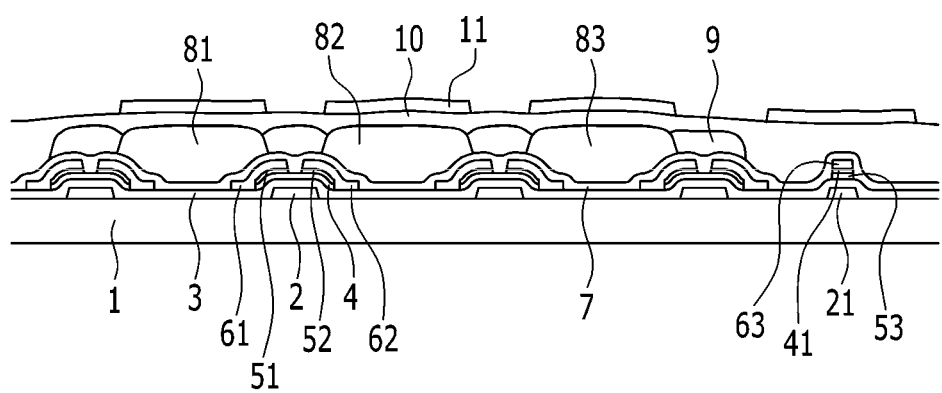
FIG. 3 is a cross-sectional view of a thin film display panel for a liquid crystal display according to an exemplary embodiment of the present system and method.

FIG. 3 is a cross-sectional view of a thin film display panel for a liquid crystal display according to an exemplary embodiment of the present system and method.

Gate electrodes 2 including the gate lines and a gate step compensating member 21 are formed on the transparent insulation substrate 1. The gate step compensating member 21 is formed together with the gate lines in a photolithography process for forming the gate lines and thus is formed using the same material as that of the gate lines.

A gate insulating layer 3 is formed on the gate lines and the first step compensating member 21. A semiconductor unit 4 for forming channels of the thin film transistors and a semiconductor step compensating member 41 are formed on the gate insulating layer 3. The semiconductor step compensating member 41 is formed together with the semiconductor unit 4 in a photolithography process for forming the semiconductor unit 4 and thus is formed using the same material as that of the semiconductor unit 4. Amorphous silicon may be employed as a material of the semiconductor unit 4 and the semiconductor step compensating member 41. The gate insulating layer 3 may be formed of an inorganic insulating material such as a silicon nitride (SiNx) and a silicon oxide (SiOx).

Ohmic contact layers 51 and 52 and an ohmic step compensating member 53 are respectively formed on the semiconductor unit 4 and the semiconductor step compensating member 41. The ohmic step compensating member 53 is formed together with the ohmic contact layers 51 and 52 in a photolithography process for forming the ohmic contact layers 51 and 52 and thus is formed using the same material as that of the ohmic contact layers 51 and 52. The ohmic contact layers 51 and 52 and the ohmic step compensating member 53 may be made of a material such as n+ hydrogenated amorphous silicon in which an n-type impurity such as phosphorus is doped with a high concentration, or of a silicide.

The ohmic contact layers 51 and 52 and the ohmic step compensating member 53 may be formed through the same photolithography process as that of the semiconductor unit 4 and the semiconductor step compensating member 41.

A data line including a source electrode 61, a drain electrode 62 and a data step compensating member 63 are formed on the ohmic contact layers 51 and 52 and the ohmic step compensating member 53, respectively. The data step compensating member 63 is formed together with the data line in a photolithography process for forming the data line and thus is formed using the same material as that of the data line.

A passivation layer 7 may be formed on the data line and the data step compensating member 63. The passivation layer 7 may be made of an inorganic insulating material.

A red color filter 81, a green color filter 82, and a blue color filter 83 are formed on the passivation layer 7. Each of the red color filter 81, the green color filter 82, and the blue color filter 83 is disposed on a portion of the passivation layer 7 corresponding to one pixel area. No color filter is formed in the area where the step compensating members 21, 41, 53, and 63 are disposed. Areas where the red, green, and blue color filters 81, 82, and 83 are formed respectively constitute the red pixel, the green pixel, and the blue pixel, and the area where the step compensating members 21, 41, 53, and 63 are disposed constitutes the white pixel (hereinafter, the "white pixel area"). Each of the red color filter 81, the green color filter 82, and the blue color filter 83 may be formed in an island shape so as to be separated per pixel by a light blocking member 9 formed between the color filters 81, 82, and 83. The light blocking member 9 may also be formed around the circumference of the white pixel area.

A planarization layer 10 made of, e.g., a transparent organic insulating material is formed on the color filters 81, 82, and 83, the light blocking member 9, and the white pixel area. Due to the step compensating members 21, 41, 53, and 63, the height of a surface of the planarization layer 10 in the white pixel area is substantially the same as that of the red pixel, the green pixel, and the blue pixel areas where the color filters 81, 82, and 83 are formed, respectively. The height difference between the white pixel and other pixels may be equal to or smaller than 0.2 μm.

As such, by forming the step compensating members 21, 41, 53, and 63, it is possible to adjust the thin film height of the white pixel area including no color filter to be similar to that of the other color pixel areas and to prevent a U-shaped profile from being generated. According to an embodiment, for the step compensating members 21, 41, 53, and 63, the gate step compensating member 21 provides a height of about 0.6 μm, and the data step compensating member 63 provides a height of about 0.8 μm. As a result, the two step compensating members 21 and 63 together provide a height of about 1.4 μm. In some cases, this height of about 1.4 μm is sufficient for step compensation, and the semiconductor step compensating member 41 and/or the ohmic step compensating member 53 may not be formed. Alternatively, the semiconductor step compensating member 41 or the ohmic step compensating member 53 may be formed while one or both of the gate step compensating member 21 and the data step compensating member 63 may not be formed.

A pixel electrode 11 made of a transparent conductive material, such as indium tin oxide (ITO) and indium zinc oxide (IZO), is formed in every pixel. The pixel electrode 11 is connected to the thin film transistor. The pixel electrode 11 may be divided into a plurality of subpixel electrodes.

A manufacturing method of this thin film display panel 100 is described below with reference to FIG. 3.

A gate metal layer is deposited on the insulation substrate 1. A photosensitive film is coated on the gate metal layer, selectively exposed through a mask and developed to form an etching mask. Then, wet etching or dry etching is performed (these steps are called 'photo-etching') to form a gate line and the gate step compensating member 21.

Next, a gate insulating layer, an amorphous silicon layer, and a doped amorphous silicon layer, or a silicide layer, are continuously deposited on the gate line and the gate step compensating member 21. The amorphous silicon layer and the doped amorphous silicon layer or silicide layer are patterned using photo-etching to form the semiconductor unit 4, the ohmic contact layers 51 and 52, the semiconductor step compensating member 41, and the ohmic step compensating member 53. In this case, the ohmic contact layers 51 and 52 are formed to have shapes that are connected to each other.

Successively, a data metal layer is deposited and photo-etched to form the data line and the data step compensating member 63.

Next, the ohmic contact layers 51 and 52 exposed by using the data line as the etching mask are etched and removed, thereby separating the ohmic contact layers 51 and 52 from each other at opposite sides with respect to the gate electrode 2.

Next, the steps of coating, exposing, and developing a photosensitive material including a pigment are repeatedly performed, thereby forming the red color filter 81, the green color filter 82, and the blue color filter 83, and the light blocking member 9 is formed therebetween.

Successively, a transparent organic insulating material is coated on the color filters 81, 82, and 83 and the light blocking member 9 to form the planarization layer 10. The transparent conductive material is deposited on the planarization layer 10 and is photo-etched to form the pixel electrode 11.

As such, the problem of a stepped portion at the white pixel area is solved by forming the thin film transistor and simultaneously forming the step compensating members 21, 41, 53, and 63.

While the present system and method are described above in connection with exemplary embodiments, the present system and method are not limited to the disclosed embodiments. On the contrary, the present system and method are intended to cover various modifications and equivalent arrangements included within the spirit and scope of the appended claims.

DESCRIPTION OF SYMBOLS 1, 201: insulation substrate 2: gate electrode
3: gate insulating layer 4: semiconductor unit
51, 52: ohmic contact layer 61: source electrode
62: drain electrode 7: passivation layer
81, 82, 83: color filter 9: light blocking member
10: planarization layer 11: pixel electrode
21, 41, 53, 63: step compensating member

What is claimed is:

1. A display panel comprising:
   an insulation substrate including a red area, a blue area, a green area, and a white area;
   a gate line and a data line disposed on the insulation substrate;
   a step compensating member disposed in the white area on the insulation substrate;
   a red color filter, a green color filter, and a blue color filter respectively disposed at the red area, the green area, and the blue area on the insulation substrate;
   a planarization layer covering the red color filter, the green color filter, the blue color filter, and the step compensating member; and
   a plurality of pixel electrodes formed on the planarization layer and including a first pixel electrode, a second pixel electrode, a third pixel electrode, and a fourth pixel electrode spaced from each other in a direction parallel to the insulation substrate,
   wherein the first pixel electrode, the second pixel electrode, and the third pixel electrode respectively overlaps the red color filter, the green color filter, and the blue color filter,
   wherein the step compensation member is disposed between two opposite sides of the fourth pixel electrode in the direction parallel to the insulation substrate, and
   wherein the step compensating member includes a same material as that of at least one of the gate line and the data line.

2. The display panel of claim 1, wherein the step compensating member further includes a portion of a gate insulating layer covering the gate line and a portion of a passivation layer covering the data line.

3. The display panel of claim 1, wherein a height difference between the fourth pixel electrode and the first, second, and third pixel electrodes with reference to the insulation substrate is equal to or smaller than 0.2 µm.

4. The display panel of claim 1, further comprising:
   a thin film transistor connected to the gate line and the data line, and including a semiconductor unit and an ohmic contact layer,
   wherein the step compensating member further includes a same material as that of at least one of the semiconductor unit and the ohmic contact layer.

5. The display panel of claim 4, wherein a height difference between the fourth pixel electrode and the first, second, and third pixel electrodes with reference to the insulation substrate is equal to or smaller than 0.2 µm.

6. The panel of claim 1, wherein the step compensating member is electrically isolated from the fourth pixel electrode.

7. A liquid crystal display comprising:
   a first insulation substrate including a red area, a blue area, a green area, and a white area;
   a gate line and a data line disposed on the first insulation substrate;
   a step compensating member disposed in the white area on the first insulation substrate;
   a red color filter, a green color filter, and a blue color filter respectively disposed at the red area, the green area, and the blue area on the first insulation substrate;
   a planarization layer covering the red color filter, the green color filter, the blue color filter, and the step compensating member;
   a plurality of pixel electrodes formed on the planarization layer and including a first pixel electrode, a second pixel electrode, a third pixel electrode, and a fourth pixel electrode spaced from each other in a direction parallel to the first insulation substrate;
   a second insulation substrate facing the first insulation substrate;
   a common electrode formed on the second insulation substrate; and
   a liquid crystal layer disposed between the first insulation substrate and the second insulation substrate,
   wherein the first pixel electrode, the second pixel electrode, and the third pixel electrode respectively overlaps the red color filter, the green color filter, and the blue color filter,
   wherein the step compensation member is disposed between two opposite sides of the fourth pixel electrode in the direction parallel to the first insulation substrate, and
   wherein the step compensating member includes a same material as that of at least one of the gate line and the data line.

8. The liquid crystal display of claim 7, wherein the step compensating member further includes a portion of a gate insulating layer covering the gate line and a portion of a passivation layer covering the data line.

9. The liquid crystal display of claim 8, further comprising a thin film transistor disposed on the first insulation substrate and connected to the gate line and the data line, and including a semiconductor unit and an ohmic contact layer, and wherein the step compensating member includes a same material as that of at least one of the semiconductor unit and the ohmic contact layer.

* * * * *